Oct. 4, 1949.    G. E. NICHOLSON ET AL    2,483,427
CHART HUB
Filed March 21, 1946
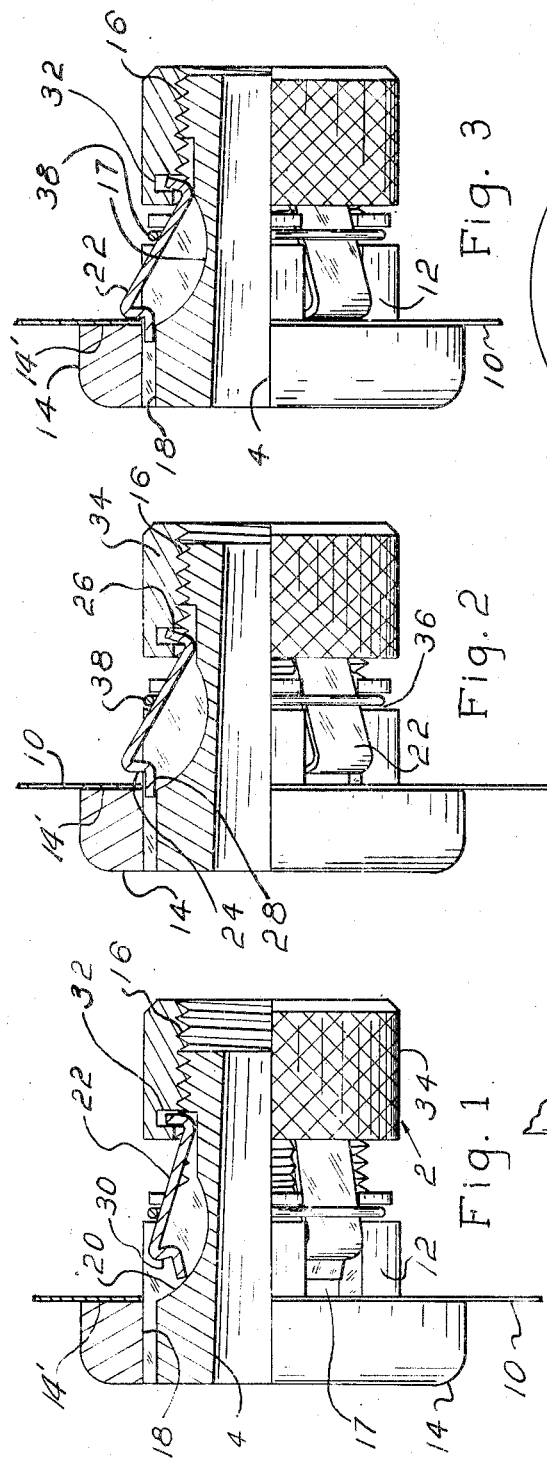
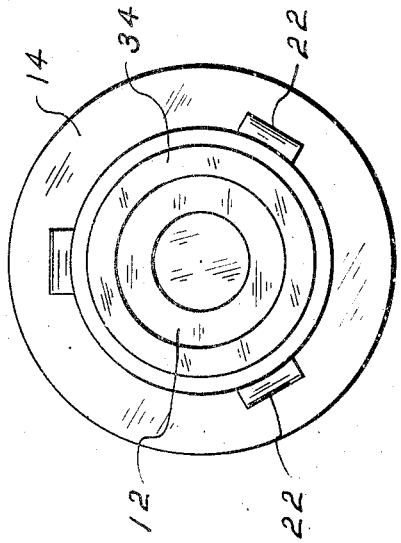
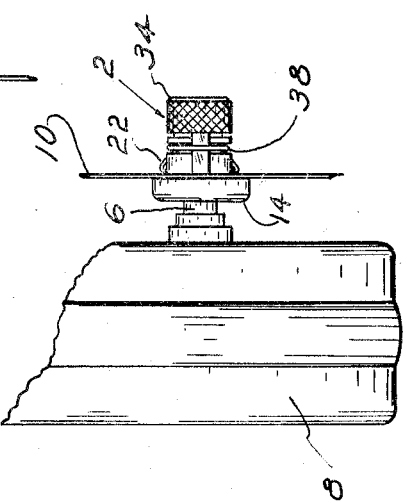
INVENTORS
G. E. NICHOLSON
J. B. McGAY
By L. M. McKnight Patented Oct. 4, 1949

2,483,427

UNITED STATES PATENT OFFICE 2,483,427

CHART HUB

George E. Nicholson and John B. McGay, Tulsa, Okla., assignors to Ohmer Corporation, Dayton, Ohio, a corporation of New York Application March 21, 1946, Serial No. 655,916

4 Claims. (Cl. 346—134)

This invention relates to chart hubs and more particularly, but not by way of limitation, to a chart hub adapted to be used on recording instruments and the like. This application is a continuation-in-part of applicants' co-preceding application No. 563,301, filed November 13, 1944, now abandoned, for a chart hub.

In present day recording meters utilizing a circular chart that has to be periodically replaced, the hub for holding the chart to the meter is usually threaded on to a meter shaft and must be taken off in order to replace the chart. This has many disadvantages in that it requires unscrewing of the hub during replacement of the chart, which is unhandy for the operator, who may drop the hub and lose it. Furthermore, during the replacement of the chart it is often necessary to hold the chart while threading the hub back on to the meter shaft which usually causes disalignment of the chart, especially in setting the chart for a specified time. To overcome these disadvantages many present day recording meters utilize various means for preventing removal of the chart hub from the meter. As an example, a chain or lever attached to the hub positioned in front of the chart for securing the hub to the meter case.

It is an important object of the present invention to provide a chart hub for a recording meter that will allow replacement of the circular chart for the meter without removing the chart hub from the meter shaft.

A further object of the invention is to provide a non-removable chart hub allowing replacement of a chart of a recording instrument expeditiously and yet effectively securing the chart to the meter.

Another object of the invention is to provide a non-removable chart hub for a recording meter which is efficient and easy to operate, durable and easy to manufacture.

And an additional object of this invention is to provide a non-removable chart hub for a recording meter wherein the clamping members move into clamping position toward the hub in such manner to prevent tearing of the chart.

With these and other objects in view, there has been illustrated on the accompanying drawing one form in which the invention may be conveniently embodied in practice.

In the drawings:

Fig. 1 is a side elevational view partly in section of the chart hub in open position.

Fig. 2 is a similar view showing the hub in semi-closed or semi-clamping position.

Fig. 3 is a similar view showing the hub in final clamping position.

Fig. 4 is an elevational view of the hub shown attached to a recording meter or the like.

Fig. 5 is an end elevation of the chart hub.

Referring now to the drawings in detail, reference character 2 represents the hub assembly comprising a tubular stud 12 having a tapered central bore 4 adapted to fit on to a shaft 6 of the recording meter 8 utilizing a replaceable circular chart 10. The tubular stud 12 has an annular flange portion 14 formed with or secured to one end thereof. The opposite end of the stud 12 is of a reduced diameter to provide a threaded portion 16 for a purpose as will be hereinafter set forth. A plurality of circumferentially spaced longitudinal slots or grooves 17 are provided in the stud member 12 and extend at one end beyond the chart contacting face 14' of the flange 14 as at 18, and at their other ends into the threaded portion 16. These end portions of the grooves are substantially parallel with the stud axis and their base walls are connected by the longitudinally concave cam surfaces 20. In each of the grooves 17 is provided a clamping member 22 having reversely bent leg portions 24 and 26 at opposite ends thereof. The leg 24 has a terminal projection 28 adapted to ride along the cam surface 20. The bend forming leg 24 provides an abutment or clamping face 30 disposed at an acute angle to the shank portion of the clamping member 22 for a purpose as will be hereinafter set forth. Each leg 26 has rockable bearing contact on the stud and is loosely engaged in an internal annular recess 32 of a nut 34 threaded on to the threads 16 of the stud 12. The outer periphery of the nut is preferably knurled to facilitate operation thereof. It will be understood that three grooves 17 and complementary clamps 22 are preferable as shown but the invention is not limited thereto.

The outer periphery of the stud 12 between the ends of grooves 17 is provided with an annular groove in which is disposed an annular wire or retaining spring 38 for holding the clamps 22 in position in the grooves 17. It will be apparent that the legs 26 of the clamps cooperate with the recess 32 and the outer end walls of grooves 17 to prevent complete unthreading and removal of the nut 34 from the threaded portion 16 of the stud 12. The large diameter portion of stud 12 and the nut 34 are of substantially equal diameter, which is predetermined with relation to the opening in the chart 10, so that when clamping members 22 are in the retracted position of Figure 1, the chart may be readily applied over said nut and stud and guided by the latter to contact the face 14' of flange 14 in accurately concentric relation with the meter shaft 6, as shown in Figure 4.

Operation

The chart is securely clamped in its applied position by threading the nut 34 inwardly on the stud. Clamping members 22 are thus moved toward the chart and as the terminals 28 thereof ride over the cam surfaces 20 they move radially outward in the respective slots 17 until the clamping faces 30 are disposed at right angles to the stud axis and parallel with the plane of the chart in opposed relation to the face of the latter. At this time and before contact of the faces 30 with the chart 10, the terminals 28 enter the respective slot portions 18, as seen in Figure 2. Thus in the further adjustment of nut 34 the clamping members are held against further radial displacement relative to the stud and chart to prevent thrust pressure against the edge of the opening in the chart or eccentric displacement of the chart relative to the axis of the stud. While maintaining this parallel relationship between the face of the chart and the clamping faces 30, in the final adjustment of the nut 34 and clamping elements 22, the chart will be securely clamped between said faces 30 and the face of the flange 14 by uniform pressure contact of the clamping members with the chart. As the terminals 28 of the clamping elements are confined in the slot portions 18, angular displacement of the clamping members relative to the stud from this position, and accidental release of the clamping pressure is impossible. This feature also obviates possible tearing or mutilation of the chart.

When a record has been completed the chart may be easily and quickly removed by threading the nut 34 outwardly on the stud 12 to withdraw the members 22 from clamping positions. In the continued outward movement of the nut the terminals 28 of the clamping members leave the slot portions 18 and ride inwardly toward the stud axis until the opposite ends of said members abut the outer end walls of slots 17, thereby preventing further unthreading of the nut and its disconnection from the stud. The clamping members are retained in this position by the ring 38, as seen in Figure 1, with the end portions 24 thereof wholly within the slots 17 so that the chart may be readily removed without tearing or mutilation, over the large diameter section of the stud 12 and the nut 34. A new chart is then applied and securely clamped against the flange 14 in the manner above explained.

It will be apparent that in the present structure the bore 4 is slightly tapered in order to provide a tight fit of the hub on a preferably tapered shaft 6 of the meter 8; however, any other similar means, such as threads and the like, may be provided for securing the hub 2 on to the meter shaft.

In the foregoing it will be apparent that the present invention effectively secures a chart to a recording meter and furthermore allows replacement of the chart on the meter without removing the clamping portion of the chart hub from the meter, thereby overcoming many disadvantages prevalent in present day chart hubs.

Changes may be made in the details of the invention disclosed herein without departing from the spirit of the invention, as expressed in the following claims.

What we claim is:

1. Chart holding means for recording instruments, comprising a stud adapted to be fixed to a movable part of the instrument, said stud having a chart supporting surface at one end, a member axially adjustable on the other end of said stud, a plurality of clamping elements operatively connected at one of their ends to said member for axial and radial movement relative to the stud in the adjustment of said member, each of said elements adjacent to its other end having an angularly disposed chart clamping face and a terminal portion projecting therefrom, means on the stud coacting with said terminal portions in the axial adjustment of said elements toward the chart to radially move said elements relative to the stud and position the clamping faces thereof in opposed substantially parallel relation to the chart, and additional means on said stud coacting with the terminal portions of said elements to restrain said elements against further radial displacement in the continued axial movement thereof to final chart clamping position.

2. Chart holding means for recording instruments as defined in claim 1, wherein said clamping elements are disposed in longitudinal grooves formed in said stud and said means for radially moving said elements comprises a cam surface on the base wall of each groove.

3. Chart holding means for recording instruments as defined in claim 2, together with a retaining element circumscribing the stud between the ends of said grooves and coacting with the clamping elements in the retracted position thereof to retain the same wholly within said grooves.

4. Chart holding means for recording instruments as defined in claim 1 wherein said adjustable member is threaded on the stud and provided with an internal groove in which the first named ends of said clamping elements are rockably engaged, together with additional means on the stud and said members coacting with said first named ends of the clamping elements to limit retracting movement of said member and prevent disconnection thereof from said stud.

GEORGE E. NICHOLSON.
JOHN B. McGAY.

REFERENCES CITED

The following references are of record in the file of this patent:

UNITED STATES PATENTS

| Number | Name | Date |
| --- | --- | --- |
| 1,414,296 | Menten | Apr. 25, 1922 |
| 1,458,531 | Hodgkinson | June 12, 1923 |